(12) United States Patent
Cortez et al.

(10) Patent No.: US 12,504,083 B2
(45) Date of Patent: Dec. 23, 2025

(54) RELIEF VALVE

(71) Applicant: Curtiss-Wright Flow Control Corporation, Brecksville, OH (US)

(72) Inventors: Erwin R.S. Cortez, North Royalton, OH (US); Nishit Dave, Middleburg Heights, OH (US); James E. Latshaw, II, North Royalton, OH (US)

(73) Assignee: CURTISS-WRIGHT FLOW CONTROL CORPORATION, Brecksville, OH (US)

( * ) Notice: Subject to any disclaimer, the term of this patent is extended or adjusted under 35 U.S.C. 154(b) by 53 days.

(21) Appl. No.: 18/299,995

(22) Filed: Apr. 13, 2023

(65) Prior Publication Data

US 2024/0344624 A1  Oct. 17, 2024

(51) Int. Cl.
*F16K 17/04*  (2006.01)

(52) U.S. Cl.
CPC ...... *F16K 17/0413* (2013.01); *F16K 17/0433* (2013.01)

(58) Field of Classification Search
CPC .......... F16K 17/0413; F16K 17/0433
USPC ...... 137/540, 15.19, 115.13, 115.18, 315.33, 137/505.11, 505.13, 505.42, 514.7, 535
See application file for complete search history.

(56) References Cited

U.S. PATENT DOCUMENTS

| | | | | |
|---|---|---|---|---|
| 2,821,208 A | * | 1/1958 | Farris | F16K 17/08 137/478 |
| 3,520,326 A | * | 7/1970 | Bowen | F16K 17/0433 137/477 |
| 3,897,802 A | | 8/1975 | Bass | |
| 3,945,607 A | * | 3/1976 | Dashner | F16K 17/0486 251/360 |
| 4,485,843 A | * | 12/1984 | Wolff | F16K 15/063 137/514 |
| 4,708,164 A | * | 11/1987 | Scallan | F16K 17/08 137/476 |
| 4,726,395 A | * | 2/1988 | Howes | F16K 1/32 137/540 |

(Continued)

FOREIGN PATENT DOCUMENTS

| CA | 1 237 630 A | 6/1988 |
|---|---|---|
| EP | 0684417 B1 | 3/1999 |
| FR | 2 376 977 A1 | 8/1978 |

OTHER PUBLICATIONS

International Search Report and Written Opinion for corresponding International Application No. PCT/US/2024/022795 mailed Jul. 17, 2024.

*Primary Examiner* — Minh Q Le
(74) *Attorney, Agent, or Firm* — Chrisman Gallo Tochtrop LLC

(57) ABSTRACT

A pressure relief valve includes a nozzle defining a bore and an outlet at an end of the bore, the outlet having a central axis; and a disc assembly that is linearly movable along the central axis to selectively engage the nozzle. The disc assembly includes a disc and a holder defining a disc cavity that accommodates the disc. Moreover, the holder includes a holder surface extending outward from a perimeter of the disc cavity, substantially radial to the central axis, and a frustoconical skirt surface extending outward from an outer perimeter of the holder surface. A ratio of an outer diameter of the holder surface to a diameter of the outlet is from 1.10 to 1.30.

20 Claims, 4 Drawing Sheets

(56) References Cited

U.S. PATENT DOCUMENTS

| | | | | |
|---|---|---|---|---|
| 4,799,506 | A | * | 1/1989 | Taylor ................ F16K 17/06 |
| | | | | 137/542 |
| 4,858,642 | A | | 8/1989 | Fain, Jr. |
| 4,932,434 | A | | 6/1990 | Taylor |
| 5,046,524 | A | * | 9/1991 | Crichton, Jr. .......... F16K 17/08 |
| | | | | 137/478 |
| 5,341,838 | A | | 8/1994 | Powell |
| 5,515,884 | A | * | 5/1996 | Danzy ............. F16K 17/0433 |
| | | | | 137/476 |
| 8,573,244 | B2 | * | 11/2013 | Taylor .............. F16K 17/406 |
| | | | | 137/71 |
| 11,773,995 | B1 | * | 10/2023 | Jassim ............. F16K 17/0413 |
| | | | | 137/535 |
| 11,788,637 | B2 | * | 10/2023 | Kalyanasundaram ................ |
| | | | | F16K 17/0426 |
| | | | | 73/1.72 |
| 2006/0071189 | A1 | * | 4/2006 | Cornwell .......... F16K 17/0486 |
| | | | | 251/55 |
| 2011/0284092 | A1 | | 11/2011 | Spencer et al. |
| 2012/0167992 | A1 | * | 7/2012 | Krithivasan .......... F16K 17/003 |
| | | | | 137/2 |
| 2014/0251462 | A1 | * | 9/2014 | McNeely ............... F16K 47/00 |
| | | | | 137/528 |
| 2017/0307094 | A1 | * | 10/2017 | Choate ................ F16K 17/06 |
| 2020/0271236 | A1 | | 8/2020 | Meshaikhis et al. |
| 2023/0088255 | A1 | * | 3/2023 | Kalyanasundaram ................ |
| | | | | F16K 15/063 |
| | | | | 137/455 |

* cited by examiner

RELIEF VALVE

FIELD OF THE INVENTION

The present disclosure relates to a relief valve and more particularly, a relief valve with reduced blowdown.

BACKGROUND OF THE INVENTION

Pressure relief valves are used in many industrial applications to prevent fluid systems from reaching undesirable high pressures. Such valves commonly include a nozzle with a valve seat that is normally closed by a slidable disc. The disc is typically biased against the valve seat in the closed position by a compression spring, fluid pressure, or both. When a pressure in the nozzle passage exceeds a predetermined set pressure, the disc "pops" open and places the nozzle passage in fluid communication with an exhaust port of the valve body. When the pressure in the nozzle passage decreases by a certain amount to a reseat pressure, the disc returns to the closed position.

The set pressure and reseat pressure of a relief valve are typically different from each other, and a "blowdown" of a relief valve can be defined as a difference between the two pressures (expressed as a percentage of set pressure). Moreover, relief valves can include various devices for adjusting the blowdown. For instance, relief valves can include an adjustable blowdown ring around the nozzle that can be adjusted in position along the nozzle. Such valves can further include a disc holder that holds the disc and forms a skirt around the nozzle and blowdown ring in the closed position. The position of the blowdown ring can be adjusted to vary how much space the ring consumes between the nozzle and skirt, which in turn can vary blowdown.

Nevertheless, the typical blowdown of a relief valve can be between 20-27%. The present disclosure provides a relief valve that may achieve significantly lower blowdown.

BRIEF SUMMARY OF THE INVENTION

The following presents a simplified summary of example embodiments of the invention. This summary is not intended to identify critical elements or to delineate the scope of the invention.

In accordance with one aspect, a pressure relief valve includes a nozzle defining a bore and an outlet at an end of the bore, the outlet having a central axis; and a disc assembly that is linearly movable along the central axis to selectively engage the nozzle. The disc assembly includes a disc and a holder defining a disc cavity that accommodates the disc. Moreover, the holder includes a holder surface extending outward from a perimeter of the disc cavity, substantially radial to the central axis, and a frustoconical skirt surface extending outward from an outer perimeter of the holder surface. A ratio of an outer diameter of the holder surface to a diameter of the outlet is from 1.10 to 1.30.

In accordance with a second aspect, a pressure relief valve includes a nozzle defining a bore and an outlet at an end of the bore, the outlet having a central axis; and a disc assembly that is linearly movable along the central axis to selectively engage the nozzle. The bore includes a first portion adjacent to the outlet and having a first diameter, a second portion spaced from the outlet and having a second diameter that is smaller than the first diameter, and a transition portion that extends from the first portion to the second portion. A ratio of the first diameter to the second diameter is less than or equal to 1.50.

In accordance with a third aspect, a pressure relief valve includes a nozzle defining a bore and an outlet at an end of the bore, the outlet having a central axis, wherein the nozzle includes a nozzle surface that extends substantially radial to the central axis. The pressure relief valve further includes a disc assembly that is linearly movable along the central axis to selectively engage the nozzle, wherein the disc assembly includes a disc and a holder defining a disc cavity that accommodates the disc. The holder includes a holder surface that extends outwardly from a perimeter of the disc cavity and faces the nozzle surface, the holder surface extending substantially radial to the central axis. Moreover, the holder includes a frustoconical skirt surface extending outward from an outer perimeter of the holder surface. The disc assembly is linearly movable between a first position in which the disc engages the nozzle and a second position in which the disc is spaced from the nozzle. In the first position, the nozzle and disc assembly define an annular huddle chamber therebetween, the huddle chamber being radially bound by the disc and the outer perimeter of the holder surface, and axially bound by the holder surface and nozzle surface. Moreover, the huddle chamber has a cross-section with an area that is 0.02 in2 or less.

BRIEF DESCRIPTION OF THE DRAWINGS

The above and other features, aspects, and advantages of the present application are better understood when the following detailed description of the present application is read with reference to the accompanying drawings, in which.

DETAILED DESCRIPTION

Figure 1:
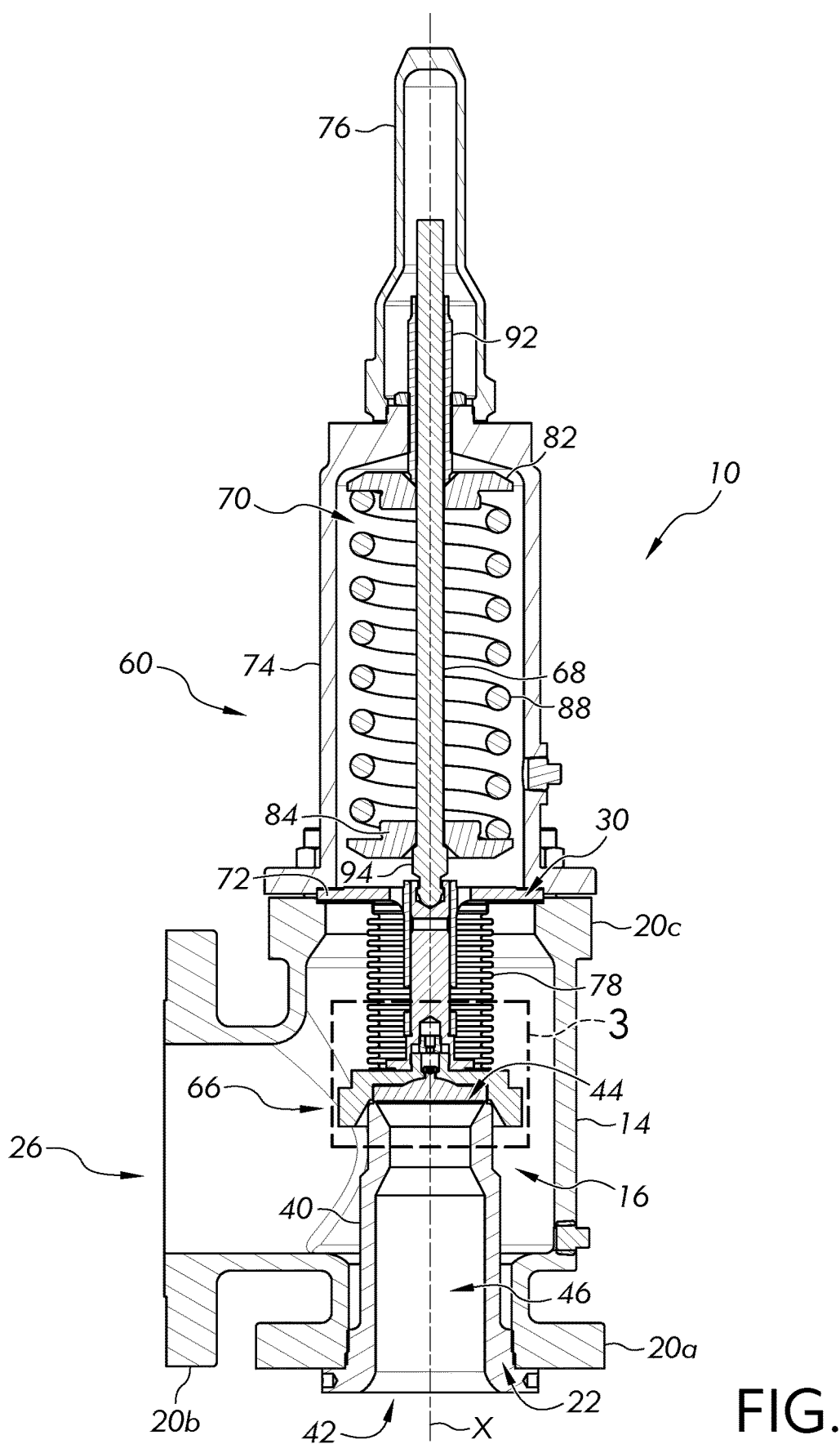
FIG. 1 is a cross-sectional view of an example relief valve in a lowered configuration.

The following is a detailed description of illustrative embodiments of the present application. As these embodiments of the present application are described with reference to the aforementioned drawings, various modifications or adaptations of the methods and or specific structures described may become apparent to those skilled in the art. All such modifications, adaptations, or variations that rely upon the teachings of the present application, and through which these teachings have advanced the art, are considered to be within the spirit and scope of the present application. Hence, these descriptions and drawings are not to be considered in a limiting sense as it is understood that the present application is in no way limited to the embodiments illustrated. Moreover, certain terminology is used herein for convenience only and is not to be taken as a limitation. Still further, in the drawings, the same reference numerals are employed for designating the same elements.

Moreover, certain terminology is used herein for convenience only and is not to be taken as a limitation. For example, relative directional terms herein such as "upper", "lower", and the like are used for convenience when describing the embodiments as oriented in the drawings. Such orientation(s), however, are arbitrary, and different orientations can result rearranging which feature might be considered the "upper" or "lower," etc.

Furthermore, the term "substantially" is intended to note that the described features are equal or approximately equal to a value or characteristic, as desired, reflecting tolerances, conversion factors, rounding off, measurement error and the like, and other factors. The term is also utilized herein to represent the degree by which a quantitative representation may vary from a stated reference without resulting in a change in the basic function of the subject matter at issue. For example, two features that are "substantially parallel" can denote features that are within about 10% of exact, for example within about 5% of exact, or within about 2% of exact. When the term "substantially" is used in describing a value or characteristic, the disclosure should be understood to include the exact value or characteristic being referred to.

Figure 2:
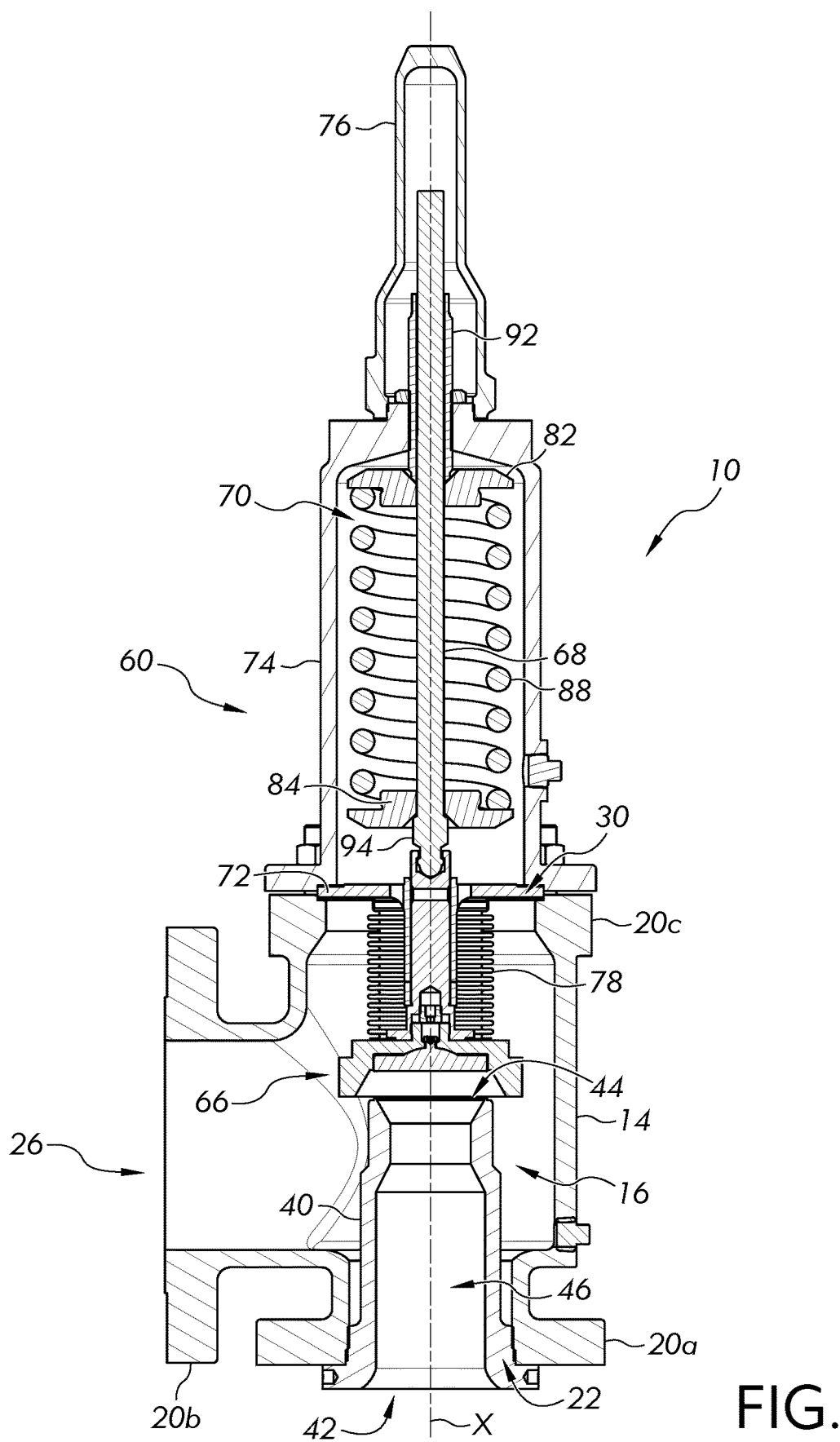
FIG. 2 is a cross-sectional view of the relief valve in a raised configuration.
Figure 3:
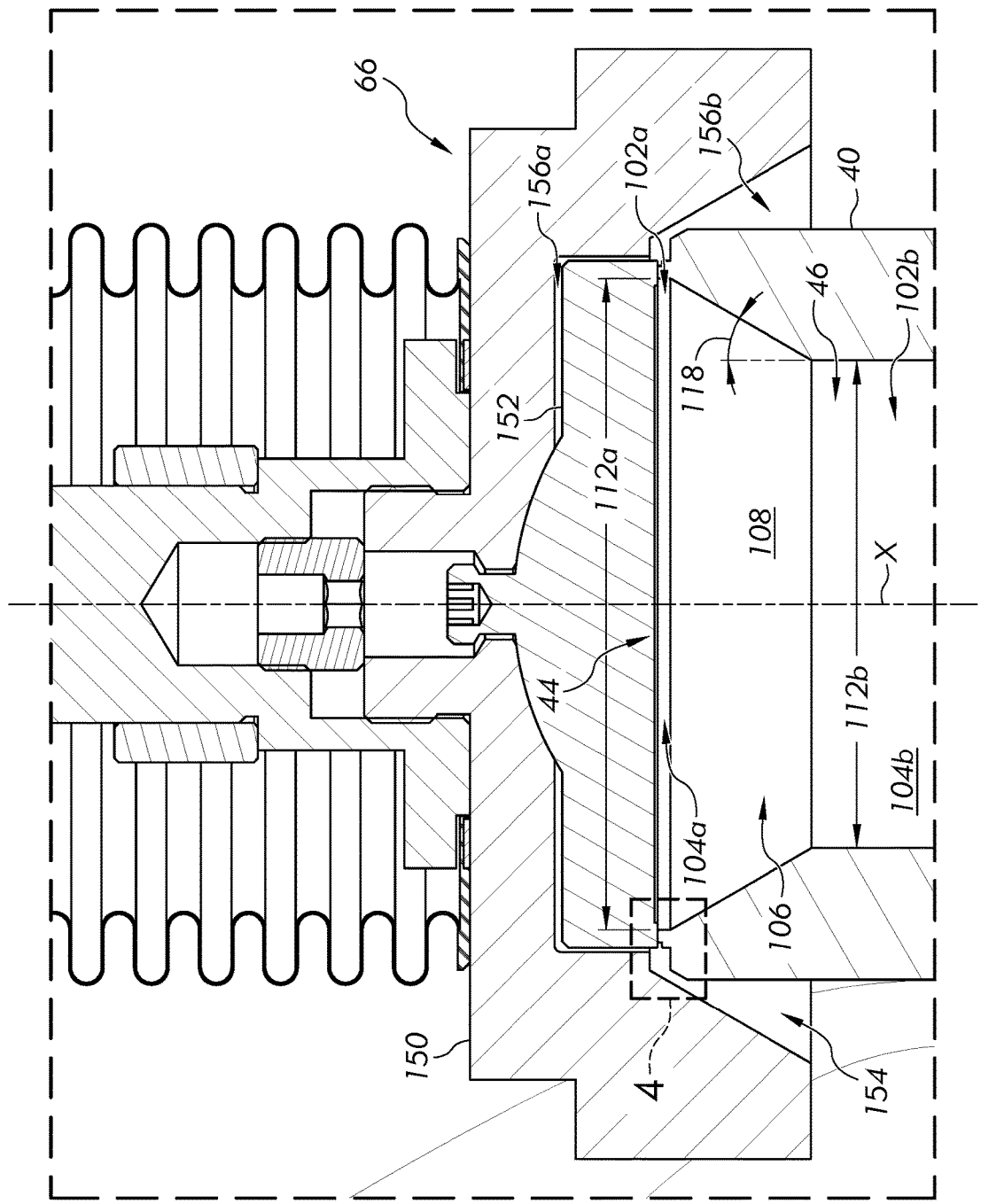
FIG. 3 is an enlarged view of section 3 in FIG. 1.
Figure 4:
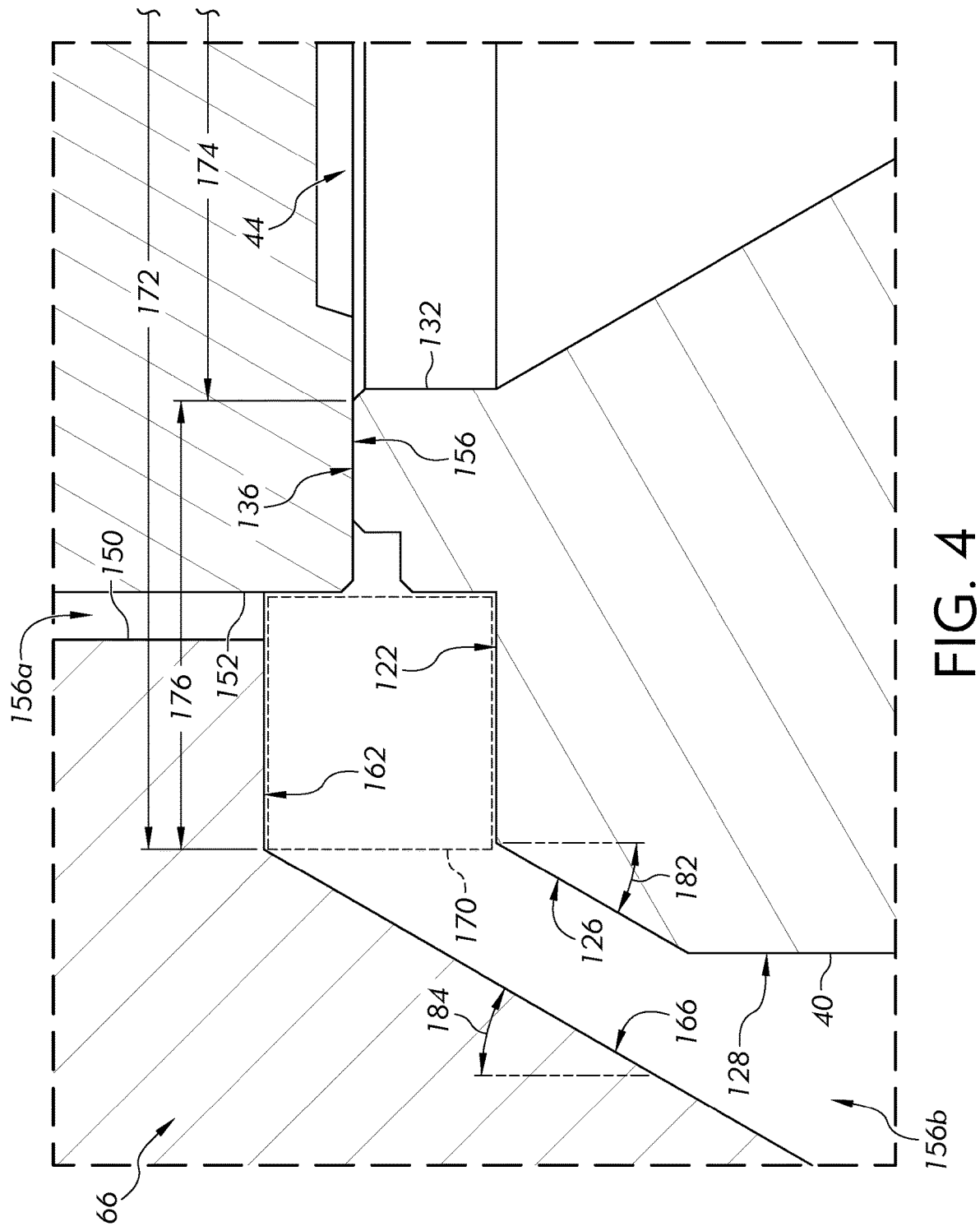
FIG. 4 is an enlarged view of section 4 in FIG. 3.

Turning to FIGS. 1-4, an example pressure relief valve 10 is shown for relieving pressure in a fluid system. FIGS. 1 and 2 show cross-section views of the relief valve 10 in lowered and raised configurations, respectively. Meanwhile, FIGS. 3 and 4 show enlarged views of FIG. 1.

As shown best in FIGS. 1 and 2, the relief valve 10 includes a body 14 that defines a chamber 16 within and a plurality of openings for providing access to the chamber 16. In particular, the body 14 has a first portion 20a that defines an inlet opening 22, a second portion 20b that defines an outlet opening 26, and a third portion 20c that defines a stem opening 30. The relief valve 10 further includes a nozzle 40 extending through the inlet opening 22 of the body 14 into the chamber 16. The nozzle 40 is a monolithic and generally tubular body having an inlet opening 42, an outlet opening 44, and a bore 46 that extends through the nozzle 40 from the inlet 42 to the outlet 44.

Notably, the outlet 44 of the nozzle 40 is a circular opening having a central axis X that the inlet 42 and bore 46 are coaxial with. Moreover, the cross-section views in FIGS. 1-3 are all taken along a plane that is parallel to and coincides with the central axis X. It is to be appreciated that the terms "axial", "radial", and variations thereof as used herein when describing various features of the relief valve 10 are relative to the central axis X of the outlet 44. Likewise, the terms "outward", "outer", "inward", "inner" are relative to the central axis X, such that outward or outer features are away from the axis as compared to inward or inner features.

The nozzle 40 is threadably inserted through the inlet portion 20a of the body 14 and fixed relative to the body 14 with a lock screw (not shown). Moreover, the relief valve 10 includes a valve assembly 60 that is operable to selectively engage the nozzle 40 to open or close its outlet 44 and provide selective fluid communication between the bore 46 and chamber 16.

In particular, the valve assembly 60 includes a disc assembly 66, a stem 68, a biasing system 70, a sleeve guide 72, a bonnet 74, a cap 76, and a bellows 78. The sleeve guide 72 is located at the stem opening 30 of the body 14, and the bonnet 74 is fixed to the body 16 (e.g., via one or more fasteners) with the sleeve guide 72 sandwiched therebetween. Moreover, the cap 76 is fixed at an upper end of the bonnet 66, and the stem 68 is configured to translate linearly through respective openings in the sleeve guide 72, bonnet 74, and cap 76.

The disc assembly 66 is located within the chamber 16 of the body 14 and is coupled to a lower end of the stem 68. Moreover, the bellows 78 surrounds the stem 68 and is fixed at its lower and upper ends to the disc assembly 66 and sleeve guide 72, respectively. In this manner, the bellows 78 can prohibit fluid communication between the chamber 16 of the body 14 and the bonnet 74 above.

The disc assembly 66 is configured to translate linearly with the stem 68 along (i.e., substantially parallel to) the central axis X of the nozzle outlet 44. In particular, the disc assembly 66 and stem 68 can translate between a lowered position (shown in FIG. 1) in which the disc assembly 66 engages the nozzle 40, and a raised position (shown in FIG. 2) in which the disc assembly 66 is spaced above the nozzle 40. When the disc assembly 66 engages the nozzle 40 in the first position, it will close the outlet 44 of the nozzle 40 and inhibit fluid communication between the bore 46 and chamber 16. Conversely, when the disc assembly 66 is spaced above the nozzle 40, the bore 46 and chamber 16 are in fluid communication via the outlet 44 of the nozzle 40.

Moreover, the biasing system 70 is configured to bias the disc assembly 66 and stem 68 toward the lowered position. Specifically, the biasing system 70 has upper and lower buttons 82, 84 that are slidably mounted on the stem 68, and a coil spring 88 that surrounds the stem 78 and is located between the upper and lower buttons 82, 84. The coil spring 88 is under a constant state of compression, such that it presses the upper button 82 against an adjustable stop member 92 at an upper portion of the bonnet 74, and presses the lower button 54 against a shoulder 94 of the stem 68, thereby applying a downward force on the stem 68 that biases the stem 68 and disc assembly 66 toward the lowered position. Moreover, the biasing force can be adjusted by linearly adjusting the axial position of the stop member 92.

The relief valve 10 as described above can be installed in a fluid system (not shown) such that the inlet 42 of the nozzle 40 is in fluid communication with the system. Moreover, the biasing system 70 can be configured to provide a biasing force to the disc assembly 66 and stem 68 that maintains the disc assembly 66 in its lowered position when a pressure within the system (and thus nozzle 40) is below a certain "set pressure" threshold. If fluid within the system exceeds the set pressure, the pressurized fluid will exert a sufficient amount of force on the disc assembly 66 that overcomes the biasing system 70 and causes the disc assembly 66 to move linearly upward and separate from the nozzle 40, thereby opening the outlet 44 of the nozzle 40 and permitting the pressurized fluid to enter the chamber 16 and eventually discharge through the outlet 26 of the body 14. In this manner, the valve 10 can relieve pressure within the system and inhibit further increase of fluid pressure therein. Moreover, if pressure within the system later drops below a certain "reseat pressure" threshold, the biasing force on the disc assembly 66 will be sufficient to return the disc assembly 66 to the lowered position and close the opening 44 of the nozzle 40.

The set pressure and reseat pressure of a relief valve are typically different from each other, and a "blowdown" of a relief valve can be defined as a difference between the two pressures (expressed as a percentage of set pressure). The typical blowdown of a relief valve can be between 20-27%. However, as discussed further below, the relief valve 10 of the present disclosure includes various features that may enable it to achieve a significantly lower blowdown (e.g., 4-8%).

Further details of the nozzle 40 and disc assembly 66 will now be described with reference to FIGS. 2 and 3. It is to be appreciated that the nozzle 40 and disc assembly 66 are substantially symmetrical about the central axis X, such that their cross-sections shown in the figures are substantially constant about the axis X. In other words, any feature of the nozzle 40 and disc assembly 66 that is radially spaced from the axis X can be described as an annular feature (with an inner perimeter and outer perimeter) that extends completely around the axis X in a symmetric and ring-like manner.

As shown in FIG. 2, the bore 46 of the nozzle 40 has a first portion 102a adjacent to the outlet 44 that is defined by a first cylindrical surface 104a of the nozzle 40; a second portion 102b axially spaced from the outlet 44 that is defined by a second cylindrical surface 104b of the nozzle 40; and a transition portion 106 that extends from the first portion 102a to the second portion 102b and is defined by a frustoconical bore surface 108 of the nozzle 40.

The cylindrical surfaces 104a, 104b of the nozzle 40 extend substantially parallel to the central axis X and have different diameters, such that the first portion 102a of the bore 46 has a first diameter 112a and the second portion 102b of the bore 46 has a second diameter 112b that is smaller than the first diameter 112a. Meanwhile, the frustoconical bore surface 108 is a tapered surface such that it gradually reduces the bore's diameter from the first portion 102a to the second portion 102b.

The inventors have found that a ratio of the first and second diameters 112a, 112b and the angle in which the frustoconical bore surface 108 is tapered between the first and second diameters 112a, 112b can improve blowdown performance of the relief valve 10. Specifically, the gradual expansion of the bore diameter from the second portion 102b to the first portion 102a can reduce vapor fraction and turbulence (as compared to valves with more abrupt expansion). Preferably, a ratio of the first diameter 112a to the second diameter 112b is less than or equal to 1.50, and more preferably from 1.10 to 1.40. Moreover, an angle 118 of the frustoconical bore surface 108 relative to the central axis X is preferably from 10° to 35°, and more preferably from 25° to 35°. For instance, the ratio of the first diameter 112a to the second diameter 112b in the present example is about 1.34, while the angle 118 is about 30°.

Referring now to FIG. 3, the exterior of the nozzle 40 includes an upper wall surface 122 that extends radial to the central axis X, a frustoconical chamfer surface 126 that extends outward and downward from an outer perimeter of the upper nozzle surface 122, and an outer wall surface 128 that extends downward from an outer perimeter of the chamfer surface 126, substantially parallel to the central axis X. Moreover, the nozzle 40 includes a shoulder 132 that extends upward from an inner perimeter of the upper nozzle surface 122, substantially parallel to the central axis X. The shoulder 132 has a seat surface 136 at its upper end that extends substantially radial to the central axis X and defines the outlet 44.

Meanwhile, the disc assembly 66 comprises a disc holder 150 that is fixed to the stem 68, and a disc 152 that is coupled to the disc holder 150. In particular, the disc holder 150 defines a cavity 154 having an upper portion 156a and a lower portion 156b, wherein the upper portion 156a is a disc cavity that accommodates and is approximate in size to the disc 152 such that it fits snugly within. In some examples, the disc 152 may be fixed to the disc holder 150. Alternatively, the disc 152 may be slightly movable (e.g., pivotable) relative to the disc holder 150 to account for misalignments between the disc assembly 66 and nozzle 40 during operation.

The disc 152 has a seat surface 156 that faces the seat surface 136 of the nozzle 40 and extends substantially radial to the central axis X. The seat surfaces 136, 156 will engage each other in the lowered position to close the nozzle 40. Moreover, the disc holder 150 comprises a holder surface 162 that extends outward from a perimeter of the disc cavity 156a (substantially radial to the central axis X), and a frustoconical skirt surface 166 that extends outward and downward from an outer perimeter of the holder surface 162.

When the disc assembly 66 is in the lowered position, the nozzle 40 and disc assembly 66 define a huddle chamber 170 therebetween that is radially bound by the disc 152 and the outer perimeter of the holder surface 162, and axially bound by the holder surface 162 and nozzle surface 122. That is, the inner and outer radial limits of the huddle chamber 170 are respectively defined by the disc 152 and the outer perimeter of the holder surface 162, while the upper and lower axial limits of the huddle chamber 170 are respectively defined by the holder surface 162 and nozzle surface 122.

The inventors have found that reducing an outer diameter 172 of the holder surface 162 to be slightly larger than a diameter 174 of the nozzle outlet 44 can improve blowdown by reducing the size of the huddle chamber 170 and providing a smaller effective area for pressurized fluid to act on the disc assembly 66. However, the outer diameter 172 and huddle chamber 170 must still be sufficiently large to inhibit interference between the disc holder 150 and nozzle 40 that could impede proper seating of the disc 152 in the lowered position.

In this regard, a ratio of the outer diameter 172 of the holder surface 162 to the diameter 174 of the outlet 44 is preferably equal to or less than 1.30, and more preferably from 1.05 to 1.20, and still more preferably from 1.10 to 1.15. Moreover, a radial distance 176 between the outlet 44 and the outer diameter 172 of the holder surface 162 is preferably 0.25 inches or less, and more preferably 0.20 inches or less. For instance, in the present example, the ratio of the outer diameter 172 of the holder surface 162 to the diameter 174 of the outlet 44 is about 1.125, while the radial distance 176 is about 0.193 inches.

Furthermore, a radial cross section of the huddle chamber 170 (taken along a plane that coincides with and extends radially from the central axis X) has an area that is preferably 0.02 $in^2$ or less, and more preferably from 0.0006 $in^2$ to 0.0150 $in^2$. As such, the volume of the chamber 170 is preferably 0.2 $in^3$ or less, and more preferably from 0.005 $in^3$ to 0.150 $in^3$. For instance, in the present example, the huddle chamber 170 has a volume that is about 0.110 $in^3$, and a radial cross section with an area that is about 0.0100 $in^2$.

Moreover, the frustoconical chamfer surface 126 of the nozzle 40 is substantially parallel to the frustoconical skirt surface 166 of the disc holder 150, which enables the outer diameter 172 of the holder surface 162 to be minimized to achieve the preferred dimensions above without resulting in interference between the disc holder 150 and nozzle 40. In particular, the surfaces 126, 166 of the nozzle 40 and disc holder 150 extend at respective angles 182, 184 relative to the central axis X, wherein each angle 182, 184 is preferably from 25° to 40°, and more preferably from 28° to 35°. In the present example, each angle 182, 184 is about 30°.

The features of the nozzle 40 and disc assembly 66 described above can enable the relief valve 10 to achieve significantly lower blowdown than conventional relief valves. For example, the relief valve 10 in the present embodiment can achieve a blowdown of about 5-7%. Moreover, these effects can be achieved without providing an adjustable blowdown ring (or other structure) radially between the nozzle 40 and disc holder 150 in the closed position. Thus, the construction and operation of the relief valve 10 can be simplified.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A pressure relief valve comprising:
   a nozzle defining a bore and an outlet at an end of the bore, the outlet having a central axis; and
   a disc assembly that is linearly movable along the central axis to selectively engage the nozzle, the disc assembly comprising:
      a disc, and
      a holder defining a disc cavity that accommodates the disc, wherein the holder includes:
         a holder surface extending outward from a perimeter of the disc cavity, substantially radial to the central axis, and
         a frustoconical skirt surface extending outward from an outer perimeter of the holder surface,
      wherein the nozzle includes a nozzle surface that faces the holder surface and extends substantially radial to the central axis, and a frustoconical chamfer surface that extends outwardly from an outer perimeter of the nozzle surface, and
   wherein a ratio of an outer diameter of the holder surface to a diameter of the outlet is from 1.10 to 1.30.

2. The pressure relief valve according to claim 1, wherein a radial distance between the outlet and the outer diameter of the holder surface is 0.2 inches or less.

3. The pressure relief valve according to claim 1, wherein the frustoconical skirt surface of the holder is substantially parallel to the frustoconical chamfer surface of the nozzle.

4. The pressure relief valve according to claim 3, wherein an angle of the frustoconical skirt surface relative to the central axis is from 25° to 40°.

5. The pressure relief valve according to claim 3, wherein the nozzle includes an outer wall surface that extends from an outer perimeter of the frustoconical chamfer surface substantially parallel to the central axis.

6. The pressure relief valve according to claim 3, wherein the nozzle includes a shoulder that extends from an inner perimeter of the nozzle surface substantially parallel to the central axis.

7. The pressure relief valve according to claim 6, wherein:
   the disc assembly is linearly movable between a first position in which the disc engages the nozzle and a second position in which the disc is spaced from the nozzle, and
   the shoulder of the nozzle defines a seat surface that engages the disc when the disc assembly is in the first position.

8. The pressure relief valve according to claim 1, wherein the bore comprises:
   a first portion adjacent to the outlet and having a first diameter,
   a second portion spaced from the outlet and having a second diameter that is smaller than the first diameter, and
   a transition portion that extends from the first portion to the second portion,
   wherein a ratio of the first diameter to the second diameter is less than or equal to 1.50.

9. The pressure relief valve according to claim 8, wherein the nozzle has a frustoconical bore surface that defines the transition portion of the bore, wherein an angle of the frustoconical bore surface relative to the central axis is from 10° to 35°.

10. The pressure relief valve according to claim 9, wherein the angle of the frustoconical bore surface is from 25° to 35°.

11. The pressure relief valve according to claim 8, wherein the nozzle has first and second cylindrical surfaces that respectively define the first and second portions of the bore, wherein the first and second cylindrical surfaces extend substantially parallel to the central axis.

12. The pressure relief valve according to claim 1, wherein:
   the nozzle includes a nozzle surface that faces the holder surface and extends substantially radial to the central axis,
   the disc assembly is linearly movable between a first position in which the disc engages the nozzle and a second position in which the disc is spaced from the nozzle, wherein in the first position, the nozzle and disc assembly define an annular huddle chamber therebetween, the huddle chamber being radially bound by the disc and the outer perimeter of the holder surface, and axially bound by the holder surface and nozzle surface, and
   the huddle chamber has a cross-section with an area that is 0.02 in$^2$ or less.

13. The pressure relief valve according to claim 12, wherein a volume of the huddle chamber is from 0.005 in$^3$ to 0.150 in$^3$.

14. The pressure relief valve according to claim 1, wherein:
   the disc assembly is linearly movable between a first position in which the disc engages the nozzle and a second position in which the disc is spaced from the nozzle, and
   no other structure is located radially between the nozzle and the holder in the first position.

15. The pressure relief valve according to claim 1, wherein the nozzle is a monolithic body.

16. A pressure relief valve comprising:
   a nozzle defining a bore and an outlet at an end of the bore, the outlet having a central axis; and
   a disc assembly that is linearly movable along the central axis to selectively engage the nozzle,
   wherein the bore comprises:
      a first portion adjacent to the outlet and having a first diameter,
      a second portion spaced from the outlet and having a second diameter that is smaller than the first diameter, wherein a ratio of the first diameter to the second diameter is less than or equal to 1.50, and
      a transition portion that extends from the first portion to the second portion, and
   wherein the nozzle has a frustoconical bore surface that defines the transition portion of the bore, wherein an angle of the frustoconical bore surface relative to the central axis is from 10° to 35°.

17. The pressure relief vale according to claim 16, wherein the angle of the frustoconical bore surface is from 25° to 35°.

18. The pressure relief valve according to claim 16, wherein the nozzle has first and second cylindrical surfaces that respectively define the first and second portions of the bore, wherein the first and second cylindrical surfaces extend substantially parallel to the central axis.

19. A pressure relief valve comprising:
a nozzle defining a bore and an outlet at an end of the bore, the outlet having a central axis, wherein the nozzle includes a nozzle surface that extends substantially radial to the central axis; and
a disc assembly that is linearly movable along the central axis to selectively engage the nozzle, the disc assembly comprising:
a disc, and
a holder defining a disc cavity that accommodates the disc, wherein the holder includes:
a holder surface that extends outwardly from a perimeter of the disc cavity and faces the nozzle surface, the holder surface extending substantially radial to the central axis, and
a frustoconical skirt surface extending outward from an outer perimeter of the holder surface,
wherein the disc assembly is linearly movable between a first position in which the disc engages the nozzle and a second position in which the disc is spaced from the nozzle,
wherein in the first position, the nozzle and disc assembly define an annular huddle chamber therebetween, the huddle chamber being radially bound by the disc and the outer perimeter of the holder surface, and axially bound by the holder surface and nozzle surface, and
wherein the huddle chamber has a cross-section with an area that is 0.02 $in^2$ or less.

20. The pressure relief valve according to claim 19, wherein the area of the cross-section is 0.01 $in^2$ or less.

* * * * *